United States Patent
Chen

(10) Patent No.: US 10,602,273 B2
(45) Date of Patent: Mar. 24, 2020

(54) AUDIO PLAYING APPARATUS AND AUDIO TRANSMISSION CIRCUIT

(71) Applicant: VIA Technologies, Inc., New Taipei (TW)

(72) Inventor: Wen-Chi Chen, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 16/150,283

(22) Filed: Oct. 3, 2018

(65) Prior Publication Data
US 2020/0068306 A1 Feb. 27, 2020

(30) Foreign Application Priority Data
Aug. 27, 2018 (TW) .............................. 107129753 A

(51) Int. Cl.
*H04R 5/033* (2006.01)
*H04R 5/04* (2006.01)
(Continued)

(52) U.S. Cl.
CPC .............. *H04R 5/033* (2013.01); *H01R 24/58* (2013.01); *H01R 27/02* (2013.01); *H04R 5/04* (2013.01);
(Continued)

(58) Field of Classification Search
CPC ...... H04R 5/033; H04R 5/04; H04R 2420/03; H01R 24/58; H01R 27/02; G06F 2213/0042
See application file for complete search history.

(56) References Cited

U.S. PATENT DOCUMENTS

D592,596 S    5/2009  Kolton
D607,875 S    1/2010  Pedersen, II
(Continued)

FOREIGN PATENT DOCUMENTS

CN    303287328    7/2015
CN    304118778    4/2017
(Continued)

OTHER PUBLICATIONS

"Office Action of Taiwan Counterpart Application", dated May 7, 2019, pp. 1-3.
(Continued)

*Primary Examiner* — Regina N Holder
(74) *Attorney, Agent, or Firm* — JCIPRNET

(57) ABSTRACT

An audio playing apparatus and an audio transmission circuit are provided. The audio playing apparatus includes a first audio connector, a second audio connector, a player, and an audio transmission circuit. The second audio connector has a different interface specification than an interface specification of the first audio connector. The audio transmission circuit is coupled to the first audio connector, the second audio connector and the player. The audio transmission circuit detects a power pin of the first audio connector and a power pin of the second audio connector to obtain a determination result, and selects one of the first audio connector and the second audio connector as a target connector according to the determination result, so as to transmit an audio signal associated with the target connector to the player.

24 Claims, 3 Drawing Sheets

(51) Int. Cl.
　　　*H04R 27/02*　　(2006.01)
　　　*H01R 27/02*　　(2006.01)
　　　*H01R 24/58*　　(2011.01)

(52) U.S. Cl.
　　　CPC .. *G06F 2213/0042* (2013.01); *H04R 2420/03* (2013.01); *H04R 2420/05* (2013.01); *H04R 2420/09* (2013.01)

(56) References Cited

U.S. PATENT DOCUMENTS

| | | | |
|---|---|---|---|
| 2009/0179768 A1* | 7/2009 | Sander | H04M 1/05 340/13.27 |
| 2017/0223449 A1* | 8/2017 | Miki | H04R 3/00 |

FOREIGN PATENT DOCUMENTS

| | | | |
|---|---|---|---|
| CN | 304694661 | 6/2018 | |
| EP | 3122069 A1 * | 1/2017 | .............. H04R 5/04 |
| JP | 2005311859 | * 11/2005 | |
| TW | M493836 | 1/2015 | |
| TW | 201633800 | 9/2016 | |
| TW | M539723 | 4/2017 | |
| TW | 201737756 | 10/2017 | |

OTHER PUBLICATIONS

"Office Action of Taiwan Counterpart Application," dated Oct. 31, 2019, p. 1-p. 6.

* cited by examiner

AUDIO PLAYING APPARATUS AND AUDIO TRANSMISSION CIRCUIT

CROSS-REFERENCE TO RELATED APPLICATION

This application claims the priority benefit of Taiwan application serial no. 107129753, filed on Aug. 27, 2018. The entirety of the above-mentioned patent application is hereby incorporated by reference herein and made a part of this specification.

BACKGROUND

Technical Field

The disclosure relates to an audio playing apparatus, and particularly relates to an audio playing apparatus and an audio transmission circuit compatible with connectors of different specifications.

Description of Related Art

With the development of technology, users have been extensively using mobile apparatuses, such as smart phones or tablet computers, to play various kinds of multimedia data. For a high-quality listening experience, the user normally connects an earphone to the mobile apparatus to play audio data stored in the mobile apparatus. However, the mobile apparatus normally has the audio transmission interface with only a single specification (e.g., an audio slot or a universal serial bus (USB) slot). Therefore, the user needs to purchase earphones of different specifications for connection to meet the specifications of the transmission interfaces of different mobile apparatuses. Consequently, the use of earphones becomes less convenient.

SUMMARY

The disclosure provides an audio playing apparatus and an audio transmission circuit to support connectors of different specifications.

An embodiment of the disclosure provides an audio playing apparatus. The audio playing apparatus includes a first audio connector, a second audio connector, a player, and an audio transmission circuit. The second audio connector has a different interface specification than an interface specification of the first audio connector. The audio transmission circuit is coupled to the first audio connector, the second audio connector and the player. The audio transmission circuit detects a power pin of the first audio connector and a power pin of the second audio connector to obtain a determination result, and selects one of the first audio connector and the second audio connector as a target connector according to the determination result, so as to transmit an audio signal associated with the target connector to the player.

An embodiment of the disclosure further provides an audio transmission circuit. The audio transmission circuit includes a power detecting circuit, an audio processing circuit, and an audio switching circuit. The power detecting circuit is coupled to the power pin of the first audio connector and the power pin of the second audio connector. The power detecting circuit detects the power pin of the first audio connector and the power pin of the second audio connector to obtain the determination result. The audio processing circuit is coupled to a data pin of the second audio connector to process first audio data of the data pin and generate a second audio signal associated with the second audio connector. The audio switching circuit is coupled to an audio pin of the first audio connector to receive a first audio signal associated with the first audio connector. The audio switching circuit is coupled to the audio processing circuit to receive the second audio signal. The audio switching circuit is coupled to the power detecting circuit to receive the determination result. The audio switching circuit selects one of the first audio signal and the second audio signal according to the determination result, so as to output the first audio signal or the second audio signal to the player.

Based on the above, in the embodiments of the disclosure, the audio transmission circuit of the audio playing apparatus may obtain the determination result by detecting the power pin of the first audio connector and the power pin of the second audio connector, and select one of the first audio connector and the second audio connector as the target connector according to the determination result. Thus, the audio playing apparatus according to the embodiments of the disclosure is compatible with connectors of different specifications.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
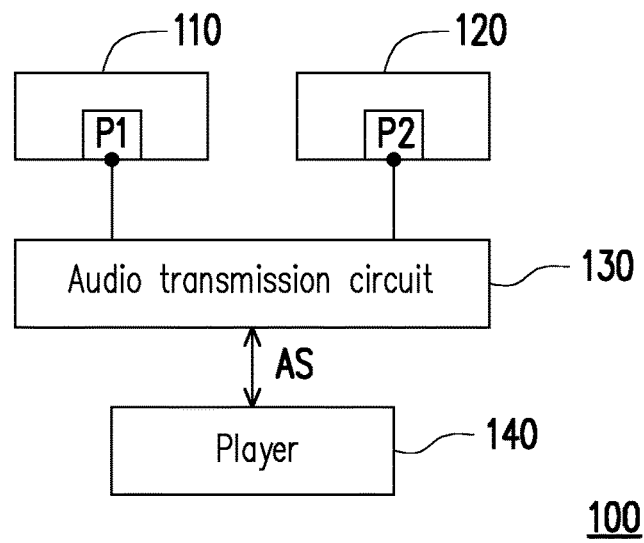
FIG. 1 is a schematic circuit block diagram illustrating an audio playing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

The term "coupled (or connected)" is used throughout the specification (including claims) may refer to any direct or indirect means of connection. For example, if it is described that a first apparatus is coupled (or connected) to a second apparatus, it should be construed that the first apparatus may be directly connected to the second apparatus, or the first apparatus may be indirectly connected to the second apparatus through another apparatus or a connection means.

Moreover, wherever possible, elements/components/steps with same reference numerals represent same or similar parts in the drawings and embodiments. Elements/components/steps with the same reference numerals or names in different embodiments may be cross-referenced.

FIG. 1 is a circuit block diagram illustrating an audio playing apparatus according to an embodiment of the disclosure. As shown in FIG. 1, the audio playing apparatus 100 includes a first audio connector 110, a second audio connector 120, an audio transmission circuit 130, and a player 140. The audio playing apparatus 100 can be connected to an external electronic device (not shown) through the first audio connector 110 or the second audio connector 120, so as to receive audio source data from the external electronic device. In addition, the second audio connector 120 and the first audio connector 110 may have different interface specifications.

According to design requirements, the first audio connector 110 and/or the second audio connector 120 may be 3.5 mm audio connectors, universal serial bus (hereinafter referred to as USB) connectors, or audio connectors of other specifications. For example, the first audio connector 110 may be a 3.5 mm audio connector and the second audio connector 120 may be a Type C universal serial bus (USB Type-C, also known as USB-C) connector. In other embodiments, the first audio connector 110 may be a Type C universal serial bus (USB Type-C, also known as a USB-C) connector, and the second audio connector 120 may be a 3.5 mm audio connector.

The audio transmission circuit 130 is coupled to the first audio connector 110, the second audio connector 120, and the player 140. The audio transmission circuit 130 may determine the power source of the audio playing apparatus 100 by detecting a power pin P1 of the first audio connector 110 and a power pin P2 of the second audio connector 120, and select one of the first audio connector 110 and the second audio connector 120 as the target connector according to the determination result, so as to transmit an audio signal AS associated with the target connector to the player 140. The player 140 may have, for example, a built-in audio receiver, an earphone or a speaker (none of these components is shown in FIG. 1). The player 140 may receive external audio source data through the built-in audio receiver (for example, a microphone), so as to transmit the audio signal AS associated with the audio receiver to the audio transmission circuit 130, and transmit the audio signal AS to the external electronic device (not shown), such as a mobile phone or a tablet, through the target connector, thereby storing the external audio source data.

The player 140 may also play the audio signal AS of the target connector through the built-in earphone or speaker. For example, in the embodiment shown in FIG. 1, assuming that the audio transmission circuit 130 determines that the power source of the audio playing apparatus 100 is the first audio connector 110, the audio transmission circuit 130 may select the first audio connector 110 as the target connector and transmit the audio signal AS associated with the first audio connector 110 to the player 140. Similarly, if the audio transmission circuit 130 determines that the power source of the audio playing apparatus 100 is the second audio connector 120, the audio transmission circuit 130 may select the second audio connector 120 as the target connector and transmit the audio signal AS associated with the second audio connector 120 to the player 140.

In an embodiment, the player 140 is an earphone with a microphone. In another embodiment, the player 140 is a headset with a microphone.

Figure 2:
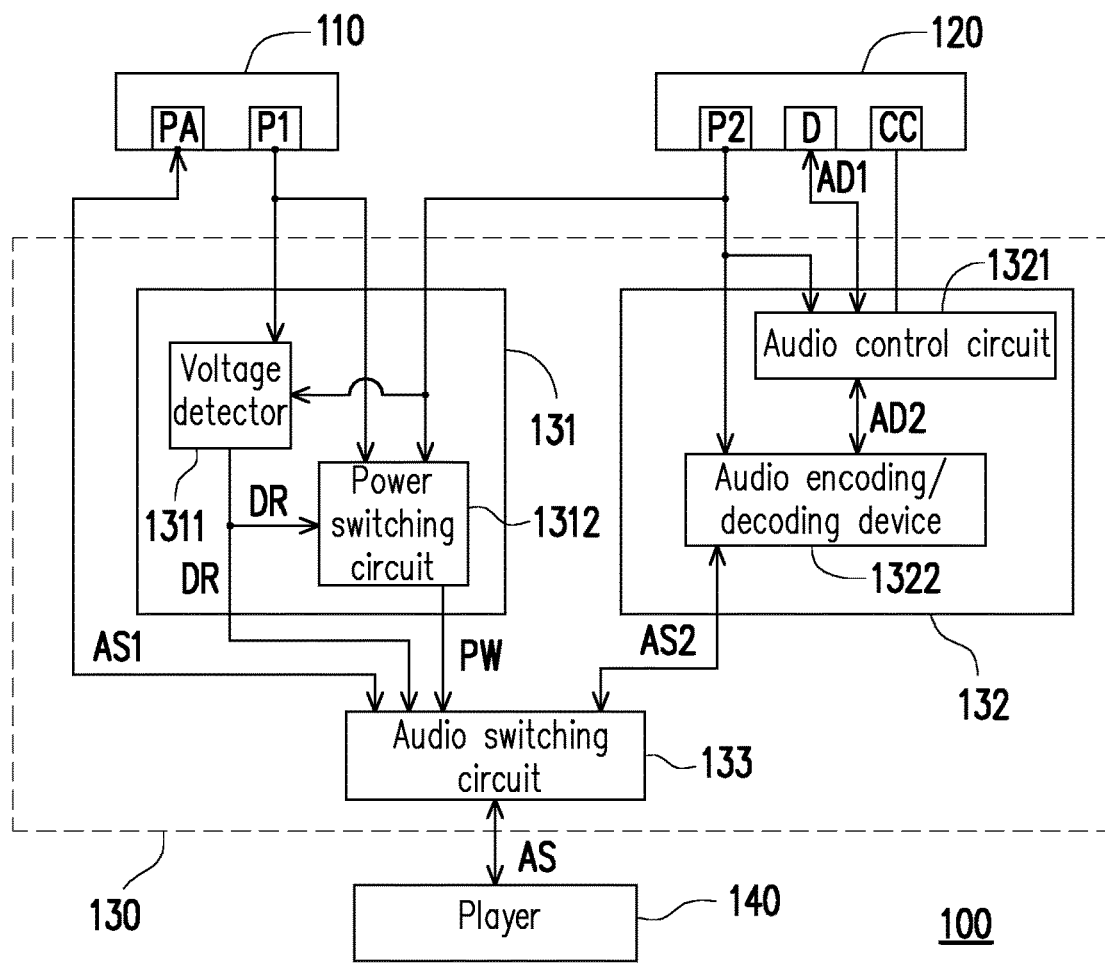
FIG. 2 is a schematic circuit block diagram illustrating the audio playing apparatus of FIG. 1 according to an embodiment of the disclosure.

FIG. 2 is a schematic circuit block diagram illustrating the audio playing apparatus 100 of FIG. 1 according to an embodiment of the disclosure. As shown in FIG. 2, the audio transmission circuit 130 includes a power detecting circuit 131, an audio processing circuit 132, and an audio switching circuit 133. The first audio connector 110 of the audio playing apparatus 100 has the power pin P1 and an audio pin PA. The second audio connector 120 of the audio playing apparatus 100 has the power pin P2 and a configuration channel pin CC. The power detecting circuit 131 is coupled to the power pin P1 of the first audio connector 110 and the power pin P2 of the second audio connector 120.

When the first audio connector 110 is connected to the external electronic device (not shown), the external electronic device may power the power detecting circuit 131 through the power pin P1 of the first audio connector 110, and transmit the first audio signal AS1 associated with the first audio connector 110 through the audio pin PA of the first audio connector 110. When the second audio connector 120 is connected to the external electronic device (not shown), the audio processing circuit 132 may transmit configuration information through the configuration channel pin CC of the second audio connector 120 and the external electronic device (not shown), and the power pin P2 of the second audio connector 120 may power the audio processing circuit 132.

The power detecting circuit 131 may detect the power pin P1 of the first audio connector 110 and the power pin P2 of the second audio connector 120 to determine the power source of the audio playing apparatus 100, thereby generating a determination result DR. The power detecting circuit 131 may also select to use the power of one of the power pin P1 of the first audio connector 110 and the power pin P2 of the second audio connector 120 to power the audio switching circuit 133 according to the determination result DR.

For example, the power detecting circuit 131 shown in FIG. 2 may include a voltage detector 1311. The voltage detector 1311 may be coupled to the power pin P1 of the first audio connector 110 and the power pin P2 of the second audio connector 120 to detect the voltage of the power pin P1 and the voltage of the power pin P2, thereby determining the power source of the audio playing apparatus 100 and obtaining the determination result. For the convenience of explanation, it is assumed here that the first audio connector 110 is a conventional 3.5 mm audio connector, and the second audio connector 120 is a USB Type-C connector.

Figure 3:
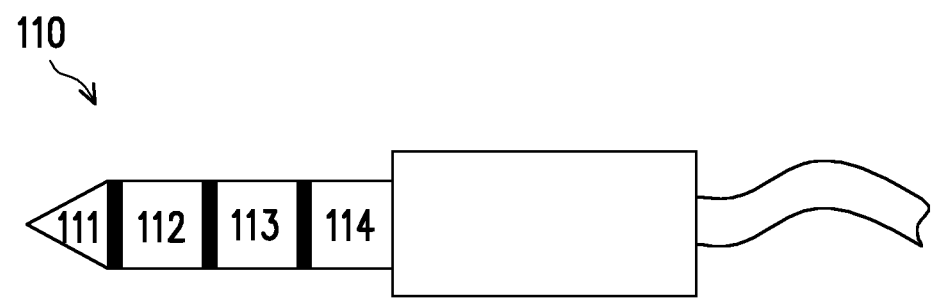
FIG. 3 is a schematic structural view illustrating a first audio connector of FIG. 2 according to an embodiment of the disclosure.

FIG. 3 is a schematic structural view illustrating the first audio connector 110 of FIG. 2 according to an embodiment of the disclosure. In the embodiment shown in FIG. 3, the first audio connector 110 can be a conventional audio connector with the specification of 3.5 mm. The first audio connector 110 includes a first ring 111, a second ring 112, a third ring 113, and a fourth ring 114. The first ring 111 of the first audio connector 110 may be configured as a left channel pin to provide a left channel signal. The second ring 112 of the first audio connector 110 may be configured as a right channel pin to provide a right channel signal. Based on different specifications of the audio connectors, in an embodiment, the third ring 113 of the first audio connector 110 may be configured as a microphone pin (power pin) and the fourth ring 114 may be configured as a ground pin. In another embodiment, the third ring 113 of the first audio connector 110 may be configured as the ground pin, and the fourth ring 114 may be configured as a microphone pin (power pin).

According to different standards of 3.5 mm audio connectors, the power pin P1 of the first audio connector 110 may be the third ring or the fourth ring of a 3.5 mm audio connector. For the convenience of explanation, the present embodiment assumes that the power pin P1 of the first audio connector 110 is the third ring 113 of the 3.5 mm audio connector. Referring to FIG. 2, under the assumption that the second audio connector 120 is a USB Type-C connector, the power pin P2 of the second audio connector 120 may include a power pin VBUS of the USB Type-C connector. If the voltage of the power pin P1 measured by the voltage detector 1311 is 1.8 to 2.2V, the voltage detector 1311 may determine that the first audio connector 110 has been inserted into the external electronic device (not shown). Similarly, if the voltage of the power pin P2 measured by the voltage detector 1311 is 5V, the voltage detector 1311 may determine that the second audio connector 120 has been inserted into the external electronic device (not shown).

The power detecting circuit 131 shown in FIG. 2 further includes a power switching circuit 1312. The power switching circuit 1312 is coupled to the power pin P1 of the first audio connector 110 and the power pin P2 of the second audio connector 120. The power switching circuit 1312 may select the first audio connector 110 as the target connector or select the second audio connector 120 as the target connector according to the determination result DR of the voltage detector 1311, and the power switching circuit 1312 may use power PW of the power pin of the target connector to power the audio switching circuit 133.

For example, when the power switching circuit 1312 selects the first audio connector 110 as the target connector, the power switching circuit 1312 may use the power provided by the power pin P1 of the first audio connector 110 as the power PW to power the audio switching circuit 133. Similarly, when the power switching circuit 1312 selects the second audio connector 120 as the target connector, the power switching circuit 1312 may use the power provided by the power pin P2 of the second audio connector 120 as the power PW to power the audio switching circuit 133.

Referring again to FIG. 2, the second audio connector 120 of the audio playing apparatus 100 also has a data pin D. In the present embodiment, it is assumed that the data pin D may include differential signal pins DP and DN of the USB Type-C connector. The audio processing circuit 132 of the audio transmission circuit 130 is coupled to the data pin D of the second audio connector 120 to receive first audio data AD1 provided by the external electronic device (not shown). The audio processing circuit 132 processes the first audio data AD1 of the data pin D, which in turn generates a second audio signal AS2 associated with the second audio connector 120.

For example, the audio processing circuit 132 may include an audio control circuit 1321 and an audio encoding/decoding device 1322. The audio control circuit 1321 and the audio encoding/decoding device 1322 are coupled to the power pin P2 of the second audio connector 120 to receive the power of the power pin P2. Therefore, the power pin P2 of the second audio connector 120 may power the audio control circuit 1321 and the audio encoding/decoding device 1322. The audio control circuit 1321 is coupled to the data pin D of the second audio connector 120 to receive the first audio data AD1. The audio control circuit 1321 may process the first audio data AD1 to convert the first audio data AD1 to second audio data AD2. For example, the audio control circuit 1321 may decode (unpack) the first audio data AD1 in the USB transfer format to generate the second audio data AD2 in a digital format. The audio encoding/decoding device 1322 is coupled to the audio control circuit 1321 to receive the second audio data AD2. The audio encoding/decoding device 1322 may convert the second audio data AD2 into the second audio signal AS2 associated with the second audio connector 120. For example, the audio encoding/decoding device 1322 may convert the second audio data AD2 in a digital format to the second audio signal AS2 in an analog format.

In the embodiment of FIG. 2, the audio switching circuit 133 of the audio transmission circuit 130 is coupled to the audio pin PA of the first audio connector 110 to receive the first audio signal AS1. In the present embodiment, it is assumed that the audio pin PA may include the first ring 111 and/or the second ring 112 of the 3.5 mm audio connector. The audio switching circuit 133 is coupled to the audio processing circuit 132 to receive the second audio signal AS2. The audio switching circuit 133 is also coupled to the voltage detector 1311 of the power detecting circuit 131 to receive the determination result DR provided by the voltage detector 1311. According to the determination result DR, the audio switching circuit 133 may select one of the first audio signal AS1 and the second audio signal AS2 as the audio signal AS of the target connector, and output the audio signal AS of the target connector to the player 140 for a playback operation. In addition, both the first audio signal AS1 and the second audio signal AS2 may include a left channel signal and a right channel signal to provide a user with a stereo listening experience. In other embodiments, the player 140 may also receive audio source data in the surrounding environment through the built-in audio receiver (for example, a microphone), so as to transmit the audio signal AS associated with the audio receiver back to the audio transmission circuit 130, and then transmit the audio signal AS to the external electronic device (not shown), such as a mobile phone or a tablet, through the target connector, thereby storing the audio source data in the surrounding environment.

Figure 4:
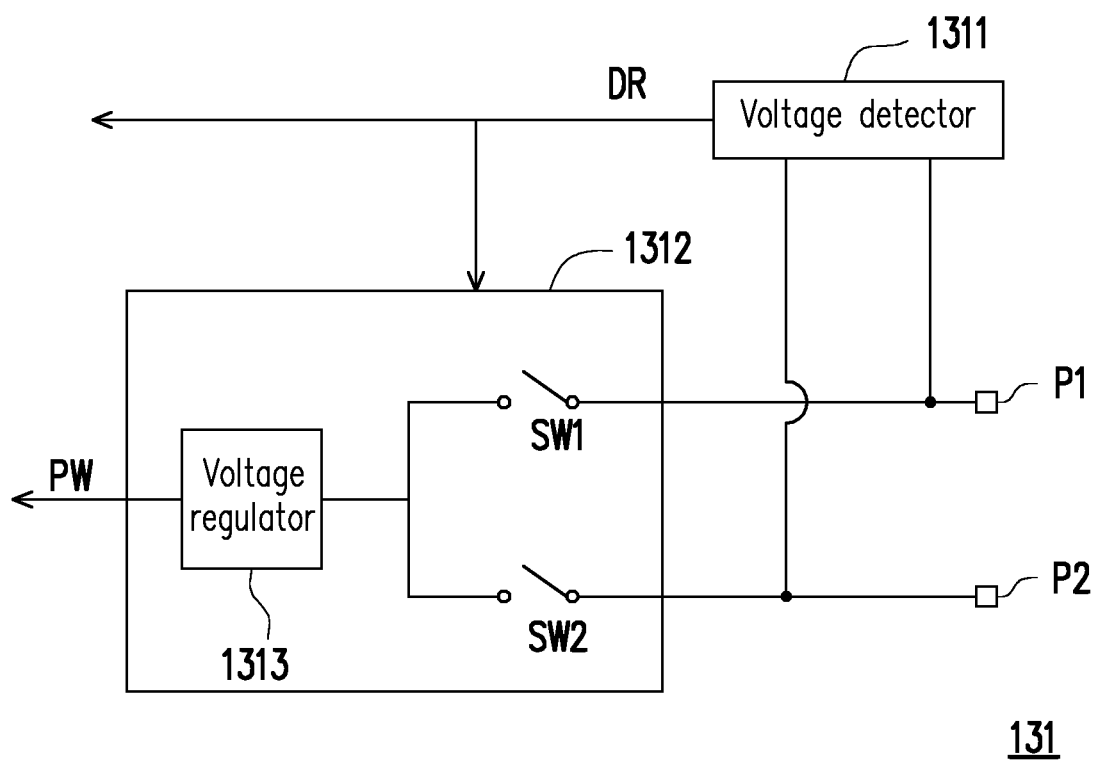
FIG. 4 is a schematic circuit block diagram illustrating a power detecting circuit of FIG. 2 according to an embodiment of the disclosure.

FIG. 4 is a schematic circuit block diagram illustrating the power detecting circuit 131 of FIG. 2 according to an embodiment of the disclosure. As shown in FIG. 4, the power switching circuit 1312 of the power detecting circuit 131 includes a switch SW1, a switch SW2, and a voltage regulator 1313. The first end of the switch SW1 is coupled to the power pin P1 of the first audio connector 110. In the present embodiment, the first audio connector 110 may be a 3.5 mm audio connector as shown in FIG. 3, and the third ring 113 of the first audio connector 110 is set as the microphone pin (power pin). That is, the third ring 113 serves as the power pin P1 of the first audio connector 110. The first end of the switch SW2 is coupled to the power pin P2 of the second audio connector 120. In the present embodiment, the second audio connector 120 may be a USB Type-C connector, and the power pin P2 of the second audio connector 120 may include the power pin VBUS of the USB Type-C connector.

The input end of the voltage regulator 1313 is coupled to the second end of the switch SW1 and the second end of the switch SW2, and the output end of the voltage regulator 1313 may power the audio switching circuit 133. The switch SW1 is controlled by the determination result DR of the voltage detector 1311. The switch SW2 is also controlled by the determination result DR of the voltage detector 1311. For example, assuming that the determination result DR of the voltage detector 1311 indicates that the first audio connector 110 has been inserted into the external electronic device (not shown), the power switching circuit 1312 may turn on the switch SW1 and turn off the switch SW2, so that the voltage regulator 1313 may use the power of the power pin P1 to generate the power PW to the audio switching circuit 133.

On the other hand, if the determination result DR of the voltage detector 1311 indicates that the second audio connector 120 has been inserted into the external electronic device (not shown), the power switching circuit 1312 may turn on the switch SW2 and turn off the switch SW1, so that the voltage regulator 1313 may use the power of the power pin P2 to generate the power PW to the audio switching circuit 133.

Figure 5:
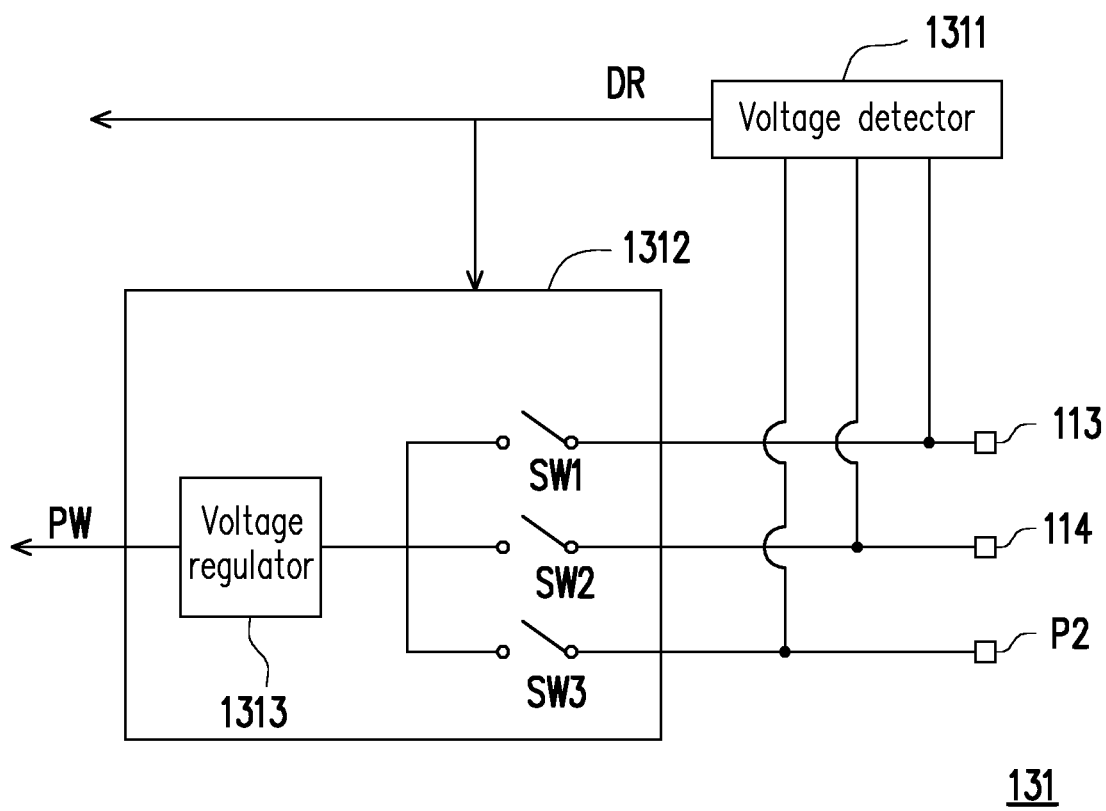
FIG. 5 is a schematic circuit block diagram illustrating a power detecting circuit of FIG. 2 according to another embodiment of the disclosure.

FIG. 5 is a schematic circuit block diagram illustrating the power detecting circuit 131 of FIG. 2 according to another embodiment of the disclosure. In the embodiment of FIG. 5, the first audio connector 110 may be the 3.5 mm audio connector shown in FIG. 3. The voltage detector 1311 is coupled to the third ring 113 of the 3.5 mm audio connector, the fourth ring 114 of the 3.5 mm audio connector, and the power pin P2 of the second audio connector 120. In the present embodiment, the second audio connector 120 may be a USB Type-C connector, and the power pin P2 of the second audio connector 120 may include the power pin VBUS of the USB Type-C connector.

The voltage detector 1311 may detect the third ring 113, the fourth ring 114, and the power pin P2 of the second audio connector 120 to obtain the determination result DR. Based on different standards of audio connectors, the microphone pin (power pin P1) of the first audio connector 110 may be configured to the third ring 113 or fourth ring 114 of the first audio connector 110. In the case where it is uncertain whether the microphone pin (power pin) is at the third ring 113 or the fourth ring 114, the voltage detector 1311 of the power detecting circuit 131 may detect the third ring 113 and the fourth ring 114 of the first audio connector 110 to determine the location of the microphone pin (power pin P1). For example, when the voltage detector 1311 detects that the third ring 113 has a high voltage, the voltage detector 1311 may determine that the first audio connector 110 has been inserted into the external electronic device (not shown), and the third ring 113 of the first audio connector 110 is configured as the microphone pin (power pin P1). When the voltage detector 1311 detects that the fourth ring 114 has a high voltage, the voltage detector 1311 may determine that the first audio connector 110 has been inserted into the external electronic device (not shown), and the fourth ring 114 of the first audio connector 110 is configured as the microphone pin. (power pin P1). When the voltage detector 1311 detects that the power pin P2 of the second audio connector 120 has a high voltage, the voltage detector 1311 may determine that the second audio connector 120 has been inserted into the external electronic device (not shown).

The power switching circuit 1312 is coupled to the third ring 113, the fourth ring 114, and the power pin P2 of the second audio connector 120. The power switching circuit 1312 may select one of the third ring 113, the fourth ring 114, and the power pin P2 as the target pin according to the determination result DR. The power switching circuit 1312 uses the power of the target pin to power the audio switching circuit 133.

Referring again to the embodiment shown in FIG. 5, the power switching circuit 1312 of the power detecting circuit 131 includes the switch SW1, the switch SW2, a switch SW3, and the voltage regulator 1313. The first end of the switch SW1 is coupled to the third ring 113 of the first audio connector 110. The switch SW1 is controlled by the determination result DR of the voltage detector 1311. The first end of the switch SW2 is coupled to the fourth ring 114 of the first audio connector 110. The switch SW2 is controlled by the determination result DR of the voltage detector 1311. The first end of the switch SW3 is coupled to the power pin P2 of the second audio connector 120. The switch SW3 is controlled by the determination result DR of the voltage detector 1311.

For example, assuming that the determination result DR of the voltage detector 1311 indicates that the first audio connector 110 has been inserted into the external electronic device (not shown), and the third ring 113 of the first audio connector 110 is configured as the microphone pin (power pin P1), the power switching circuit 1312 may turn on the switch SW1 and turn off the switch SW2 and the switch SW3 to transfer the power of the third audio 113 of the first audio connector 110 to the voltage regulator 1313. When the determination result DR of the voltage detector 1311 indicates that the first audio connector 110 has been inserted into the external electronic device (not shown), and the fourth ring 114 of the first audio connector 110 is configured as the microphone pin (power pin P1), the power switching circuit 1312 may turn on the switch SW2 and turn off the switch SW1 and switch SW3 to transfer the power of the fourth ring 114 of the first audio connector 110 to the voltage regulator 1313. When the determination result DR of the voltage detector 1311 indicates that the second audio connector 120 has been inserted into the external electronic device (not shown), the power switching circuit 1312 may turn on the switch SW3 and turn off the switch SW1 and switch SW2 to transfer the power of the power pin P2 of the second audio connector 120 to the voltage regulator 1313.

As shown in FIG. 5, the input end of the voltage regulator 1313 is coupled to the second end of the switch SW1, the second end of the switch SW2, and the second end of the switch SW3. The output end of the voltage regulator 1313 may power the audio switching circuit 133. According to the conduction states of the switch SW1, the switch SW2, and the switch SW3, the voltage regulator 1313 may selectively use the power of one of the third ring 113, the fourth ring 114, or the power pin P2 to generate the power PW to the audio switching circuit 133. Details about the voltage regulator 1313 shown in FIG. 5 can be construed with reference to the description of the voltage regulator 1313 shown in FIG. 4, and therefore will not be repeated in the following.

In view of the foregoing, in the embodiments of the disclosure, the audio transmission circuit of the audio playing apparatus may determine the power source of the audio playing apparatus by detecting the power pin of the first audio connector and the power pin of the second audio connector, and select one of the first audio connector and the second audio connector as the target connector according to the determination result. In addition, in some embodiments, when the power source of the audio playing apparatus is the first audio connector and the first audio connector is a 3.5 mm audio connector, the audio transmission circuit may also determine the location of the power pin of the 3.5 mm audio connector with the built-in power detecting circuit. Based on the determination result, the audio transmission circuit may transmit the audio signal associated with the target connector to the player of the audio playing apparatus. Thus, the audio playing apparatus according to the embodiments of the disclosure is compatible with connectors of different specifications.

It will be apparent to those skilled in the art that various modifications and variations can be made to the structure of the disclosure without departing from the scope or spirit of the disclosure. In view of the foregoing, it is intended that the disclosure cover modifications and variations of the disclosure provided they fall within the scope of the following claims and their equivalents.

What is claimed is:

1. An audio playing apparatus, comprising:
   a first audio connector;
   a second audio connector, wherein the second audio connector has a different interface specification than an interface specification of the first audio connector;
   a player; and
   an audio transmission circuit, coupled to the first audio connector, the second audio connector, and the player,
   wherein the audio transmission circuit performs a power detection operation to detect both a power pin of the first audio connector and a power pin of the second audio connector so as to identify which one of the first audio connector and the second audio connector serves as a power source of the audio playing apparatus,
   wherein the audio transmission circuit selects one of the first audio connector and the second audio connector as a target connector based on a determination result of the power detection operation, and transmits an audio signal associated with the target connector to the player.

2. The audio playing apparatus as claimed in claim 1, wherein either one of the first audio connector and the second audio connector comprises a 3.5 mm audio connector or a universal serial bus (USB) connector.

3. The audio playing apparatus as claimed in claim 1, wherein the player comprises an audio receiver, an earphone, or a speaker.

4. The audio playing apparatus as claimed in claim 1, wherein an audio pin of the first audio connector is configured to transmit a first audio signal associated with the first audio connector, and the audio transmission circuit comprises:
   a power detecting circuit, coupled to the power pin of the first audio connector and the power pin of the second audio connector, wherein the power detecting circuit detects the power pin of the first audio connector and the power pin of the second audio connector to obtain the determination result of the power detection operation;
   an audio processing circuit, coupled to a data pin of the second audio connector, wherein the audio processing circuit processes first audio data of the data pin to generate a second audio signal associated with the second audio connector; and
   an audio switching circuit, coupled to the audio pin of the first audio connector to receive the first audio signal, coupled to the audio processing circuit to receive the second audio signal, and coupled to the power detecting circuit to receive the determination result of the power detection operation, wherein the audio switching circuit selects one of the first audio signal and the second audio signal according to the determination result of the power detection operation to output a selected one of the first audio signal and the second audio signal to the player as the audio signal of the target connector.

5. The audio playing apparatus as claimed in claim 4, wherein the power detecting circuit further selects power received from one of the power pin of the first audio connector and the power pin of the second audio connector to power the audio switching circuit according to the determination result of the power detection operation.

6. The audio playing apparatus as claimed in claim 4, wherein the power pin of the second audio connector powers the audio processing circuit.

7. The audio playing apparatus as claimed in claim 4, wherein the audio processing circuit comprises:
   an audio control circuit, coupled to the data pin of the second audio connector to receive the first audio data, wherein the audio control circuit processes the first audio data to generate second audio data; and
   an audio encoding/decoding device, coupled to the audio control circuit to receive the second audio data, wherein the audio encoding/decoding device converts the second audio data into the second audio signal associated with the second audio connector.

8. The audio playing apparatus as claimed in claim 7, wherein the power pin of the second audio connector powers the audio control circuit and the audio encoding/decoding device.

9. The audio playing apparatus as claimed in claim 4, wherein the power detecting circuit comprises:
   a voltage detector, coupled to the power pin of the first audio connector and the power pin of the second audio connector, wherein the voltage detector detects the power pin of the first audio connector and the power pin of the second audio connector to obtain the determination result of the power detection operation; and
   a power switching circuit, coupled to the power pin of the first audio connector and the power pin of the second audio connector, wherein the power switching circuit selects one of the first audio connector and the second audio connector as the target connector according to the determination result of the power detection operation, and uses power of the power pin of the target connector to power the audio switching circuit.

10. The audio playing apparatus as claimed in claim 9, wherein the first audio connector comprises a 3.5 mm audio connector, and the power pin of the first audio connector comprises a third ring of the 3.5 mm audio connector.

11. The audio playing apparatus as claimed in claim 9, wherein the power switching circuit comprises:
    a first switch, having a first end coupled to the power pin of the first audio connector, wherein a control end of the first switch is controlled by the determination result of the power detection operation;
    a second switch, having a first end coupled to the power pin of the second audio connector, wherein a control end of the second switch is controlled by the determination result of the power detection operation; and
    a voltage regulator, having an input end coupled to a second end of the first switch and a second end of the second switch, wherein an output end of the voltage regulator powers the audio switching circuit.

12. The audio playing apparatus as claimed in claim 4, wherein the first audio connector comprises a 3.5 mm audio connector, and the power detecting circuit comprises:
    a voltage detector, coupled to a third ring of the 3.5 mm audio connector, a fourth ring of the 3.5 mm audio connector, and the power pin of the second audio connector, wherein the voltage detector detects the third ring, the fourth ring, and the power pin of the second audio connector to obtain the determination result of the power detection operation; and
    a power switching circuit, coupled to the third ring, the fourth ring, and the power pin of the second audio connector, wherein the power switching circuit selects one of the third ring, the fourth ring, and the power pin of the second audio connector as a target pin according to the determination result of the power detection operation, and the power switching circuit uses power of the target pin to power the audio switching circuit.

13. The audio playing apparatus as claimed in claim 12, wherein the power switching circuit comprises:

a first switch, having a first end coupled to the third ring of the 3.5 mm audio connector, wherein a control end of the first switch is controlled by the determination result of the power detection operation;

a second switch, having a first end coupled to the fourth ring of the 3.5 mm audio connector, wherein a control end of the second switch is controlled by the determination result of the power detection operation;

a third switch, having a first end coupled to the power pin of the second audio connector, wherein a control end of the third switch is controlled by the determination result of the power detection operation; and a voltage regulator, having an input end coupled to a second end of the first switch, a second end of the second switch, and a second end of the third switch, wherein an output end of the voltage regulator powers the audio switching circuit.

14. An audio transmission circuit, comprising:

a power detecting circuit, coupled to a power pin of a first audio connector and a power pin of a second audio connector, wherein the power detecting circuit performs a power detection operation to detect both the power pin of the first audio connector and the power pin of the second audio connector so as to identify which one of the first audio connector and the second audio connector serves as a power source of the audio transmission circuit;

an audio processing circuit, coupled to a data pin of the second audio connector, wherein the audio processing circuit processes first audio data of the data pin to generate a second audio signal associated with the second audio connector; and an audio switching circuit, coupled to an audio pin of the first audio connector to receive a first audio signal associated with the first audio connector, coupled to the audio processing circuit to receive the second audio signal, and coupled to the power detecting circuit, wherein the audio switching circuit selects one of the first audio signal and the second audio signal based on a determination result of the power detection operation to output a selected one of the first audio signal and the second audio signal to a player.

15. The audio transmission circuit as claimed in claim 14, wherein either one of the first audio connector and the second audio connector comprises a 3.5 mm audio connector or a universal serial bus (USB) connector.

16. The audio transmission circuit as claimed in claim 14, wherein the power detecting circuit further selects power received from one of the power pin of the first audio connector and the power pin of the second audio connector to power the audio switching circuit according to the determination result of the power detection operation.

17. The audio transmission circuit as claimed in claim 14, wherein the power pin of the second audio connector powers the audio processing circuit.

18. The audio transmission circuit as claimed in claim 14, wherein the audio processing circuit comprises:

an audio control circuit, coupled to the data pin of the second audio connector to receive the first audio data, wherein the audio control circuit processes the first audio data to generate second audio data; and an audio encoding/decoding device, coupled to the audio control circuit to receive the second audio data, wherein the audio encoding/decoding device converts the second audio data into the second audio signal associated with the second audio connector.

19. The audio transmission circuit as claimed in claim 18, wherein the power pin of the second audio connector powers the audio control circuit and the audio encoding/decoding device.

20. The audio transmission circuit as claimed in claim 14, wherein the power detecting circuit comprises:

a voltage detector, coupled to the power pin of the first audio connector and the power pin of the second audio connector, wherein the voltage detector detects the power pin of the first audio connector and the power pin of the second audio connector to obtain the determination result of the power detection operation; and a power switching circuit, coupled to the power pin of the first audio connector and the power pin of the second audio connector, wherein the power switching circuit selects one of the first audio connector and the second audio connector as the target connector according to the determination result of the power detection operation, and uses power of the power pin of the target connector to power the audio switching circuit.

21. The audio transmission circuit as claimed in claim 20, wherein the first audio connector comprises a 3.5 mm audio connector, and the power pin of the first audio connector comprises a third ring of the 3.5 mm audio connector.

22. The audio transmission circuit as claimed in claim 20, wherein the power switching circuit comprises:

a first switch, having a first end coupled to the power pin of the first audio connector, wherein a control end of the first switch is controlled by the determination result of the power detection operation;

a second switch, having a first end coupled to the power pin of the second audio connector, wherein a control end of the second switch is controlled by the determination result of the power detection operation; and a voltage regulator, having an input end coupled to a second end of the first switch and a second end of the second switch, wherein an output end of the voltage regulator powers the audio switching circuit.

23. The audio transmission circuit as claimed in claim 14, wherein the first audio connector comprises a 3.5 mm audio connector, and the power detecting circuit comprises:

a voltage detector, coupled to a third ring of the 3.5 mm audio connector, a fourth ring of the 3.5 mm audio connector, and the power pin of the second audio connector, wherein the voltage detector detects the third ring, the fourth ring, and the power pin of the second audio connector to obtain the determination result of the power detection operation; and a power switching circuit, coupled to the third ring, the fourth ring, and the power pin of the second audio connector, wherein the power switching circuit selects one of the third ring, the fourth ring, and the power pin of the second audio connector as a target pin according to the determination result of the power detection operation, and the power switching circuit uses power of the target pin to power the audio switching circuit.

24. The audio transmission circuit as claimed in claim 23, wherein the power switching circuit comprises:

a first switch, having a first end coupled to the third ring of the 3.5 mm audio connector, wherein a control end of the first switch is controlled by the determination result of the power detection operation;

a second switch, having a first end coupled to the fourth ring of the 3.5 mm audio connector, wherein a control end of the second switch is controlled by the determination result of the power detection operation;

a third switch, having a first end coupled to the power pin of the second audio connector, wherein a control end of the third switch is controlled by the determination result of the power detection operation; and a voltage regulator, having an input end coupled to a second end of the first switch, a second end of the second switch, and a second end of the third switch, wherein an output end of the voltage regulator powers the audio switching circuit.

* * * * *